United States Patent [19]

Meyer

[11] Patent Number: 5,064,732
[45] Date of Patent: Nov. 12, 1991

[54] SOLID POLYMER FUEL CELL SYSTEM: HIGH CURRENT DENSITY OPERATION

[75] Inventor: Alfred P. Meyer, West Simsbury, Conn.

[73] Assignee: International Fuel Cells Corporation, South Windsor, Conn.

[21] Appl. No.: 477,792

[22] Filed: Feb. 9, 1990

[51] Int. Cl.$^5$ .............................................. H01M 8/04
[52] U.S. Cl. ...................................... 429/13; 429/26; 429/120
[58] Field of Search ........................... 429/26, 13, 120

[56] References Cited

U.S. PATENT DOCUMENTS

| | | | |
|---|---|---|---|
| 3,525,386 | 8/1970 | Grover | 429/26 |
| 4,324,845 | 4/1982 | Stockel | 429/120 |
| 4,769,297 | 9/1988 | Reiser et al. | 429/17 |
| 4,824,741 | 4/1989 | Kunz | 429/26 |
| 4,826,741 | 5/1989 | Aldhart et al. | 429/19 |
| 4,826,742 | 5/1989 | Reiser | 429/33 |
| 4,853,100 | 8/1989 | Hsu | 429/26 |

OTHER PUBLICATIONS

A. Leonida, "Hydrogen/Oxygen Fuel Cells with In-Situ Product Water Removal", pp. 776–779.
M. J. Rosso, Jr. et al., "Design and Performance of an Air-Cooled Ion Exchange Membrane Fuel Cell", pp. 792–797.

Primary Examiner—Donald L. Walton
Attorney, Agent, or Firm—Alan Cohen; Pamela J. Mercier

[57] ABSTRACT

The incorporation of the hydrophilic porous element and the heat pipes in a fuel cell system enables high current density operation with a simplified accessory section as well as simplified controls, improved reliance and efficiency, and decreased maintenance and maintenance costs. The porous element, replacing the circulating pump and condenser of conventional systems, removes water from the cathode, wets the anode, and removes excess water from the system. The heat pipe system, replacing the coolant pump, coolant heat exchanger, and thermal and other controls, removes waste heat from the system.

2 Claims, 2 Drawing Sheets

SOLID POLYMER FUEL CELL SYSTEM: HIGH CURRENT DENSITY OPERATION

DESCRIPTION

1. Technical Field

This invention relates to a fuel cell system, and especially to a solid polymer fuel cell system for high current density operation.

2. Background Art

A typical solid polymer fuel cell power plant, used in the art, consists of a conventional fuel cell stack, plus accessories such as fuel and oxidant regulators, a fuel and/or oxidant circulating pump, a condenser, a coolant pump, a coolant heat exchanger, thermal and other controls, and other ancillary accessories.

The fuel cell stack, itself, is comprised of a grouping of individual fuel cells, each including an anode, a cathode, and an electrolytic membrane disposed therebetween, plus an anode and a cathode chamber. Within the fuel cell stack, a fuel, such as hydrogen, is introduced to the anode chamber, while an oxidant, such as oxygen or air, is introduced to the cathode chamber. The hydrogen is ionized, forming hydrogen ions and free electrons The electrons flow through an external load; while the ions pass through an electrolytic membrane and react with oxygen to form water.

As the hydrogen ions pass through the electrolytic membrane, water molecules are transported from the anode side to the cathode side of the membrane; potentially causing the anode to dry out. Furthermore, the water carried to the cathode by the hydrogen ions along with the water produced within the cathode tends to accumulate; blocking oxidant from reaching the electrode and decreasing cell efficiency.

Water accumulation can be avoided through the utilization of wetproofing or a hydrophobic film which causes the water to bead. Removal of the beads is accomplished with a wicking system or a hydrophilic porous separator element (hereafter referred to as a porous element) as disclosed in U.S. Pat. Nos. 4,769,297, and 4,826,742 (both of which are incorporated herein by reference). This porous element operates according to the size of the pores, and the bubble pressure related thereto Excess water in the cathode chamber is removed through the porous element into the anode chamber of an adjacent cell. In the anode chamber, evaporative cooling consumes some of the water, while the remaining water is transported across the porous element to the next cathode chamber in the cell stack; the water which evaporates, is removed from the cell in the hydrogen stream, condensed, and stored.

Increasing fuel cell efficiency and power density and causing a decrease in operating and capital costs respectively, is the ultimate goal in any fuel cell system. Recent advances in fuel cell technology allow high power density operation with increased efficiency (see FIG. 1). However, an increase in current/power density (hereafter referred to as current density) also causes an increase in both water transport across the electrolytic membrane and waste heat production; additional water transport heightens the problem of anode dry out. Furthermore, higher heat production rates can cause temperature gradients across the cell which can exacerbate cell dry out.

An improved fuel cell system which can operate at higher current density and which is not bound by the limitations imposed by temperature gradients (across the fuel cell) and anode dry out, is needed in the art.

DISCLOSURE OF INVENTION

The present invention relates to a fuel cell system for high current density operation. This system utilizes hydrophilic porous elements to transport water between cells and out of the cell stack, and heat pipes to reduce temperature gradients by removing waste heat.

The foregoing and other features and advantages of the present invention will become more apparent from the following description and accompanying drawings.

BEST MODE FOR CARRYING OUT THE INVENTION

Figure 1:
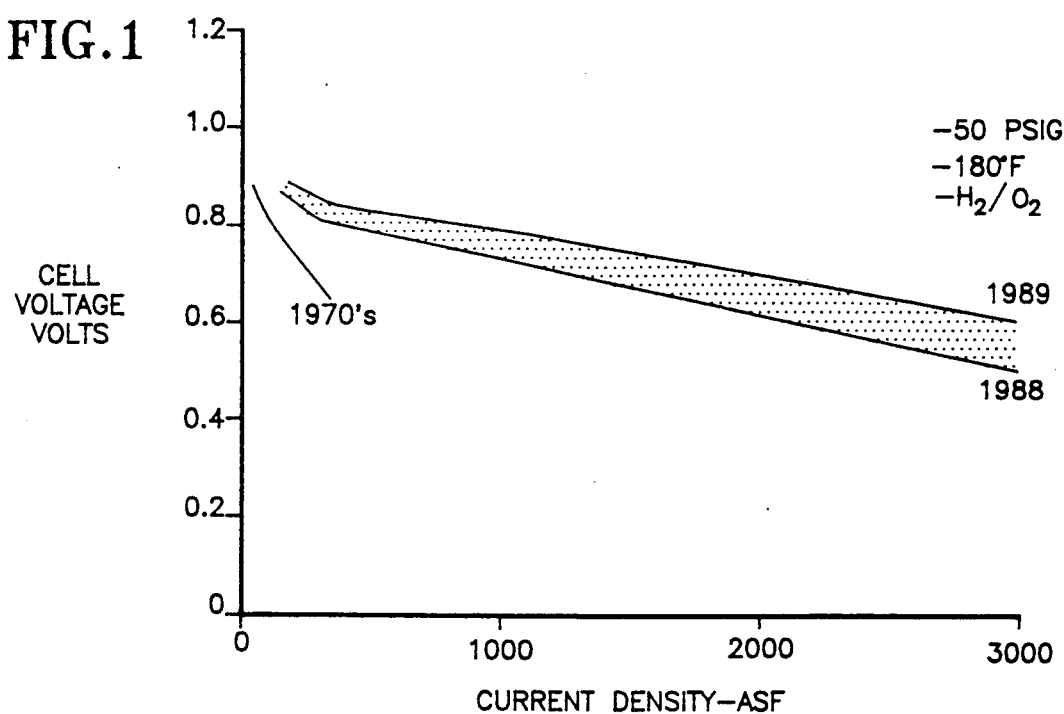
FIG. 1 is a graph which compares prior art solid polymer fuel cell performance with current solid polymer fuel cell performance

Each of the fuel cells, in the present invention (see FIG. 2), consist of an anode (5, 5'), and cathode (3, 3') catalyst (conventionally known in the art), anode chamber (2, 2'), cathode chamber (1, 1'), and electrolytic membrane (4, 4'), all of which are also known in the art, plus hydrophilic porous elements (6, 6', 7) (as disclosed in U.S. Pat. No. 4,769,297) interposed between each cell stack, for example, such that the sequence is: anode chamber (2), anode (5), electrolytic membrane (4), cathode (3), cathode chamber (1), and porous element 1 (6); with porous element 2 (7) on one end of the anode chamber (2'). The porous elements function as a means for preventing water from accumulating on the cathode side of the electrolytic membrane, and as a water removal system; while also maintaining the necessary wetting of the anode.

Figure 2:
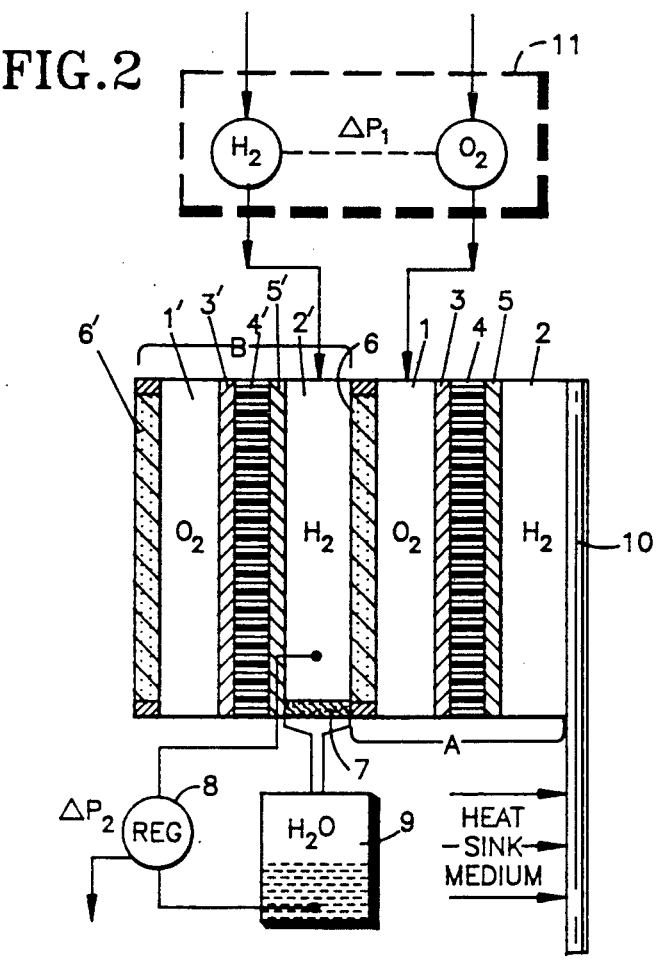
FIG. 2 is one embodiment of the present invention.

The schematic of one embodiment of the present invention is shown in FIG. 2. An oxidant, such as oxygen, which enters the cathode chamber (1), and a fuel, such as hydrogen, which enters the anode chamber (2), is regulated by coupled regulators (11) in order to maintain both an absolute and a relative pressure differential between the gases. The hydrogen is ionized via a catalyst at the anode (5), producing ions and free electrons. The ions pass through the electrolytic membrane (4) to the cathode (3). At the cathode (3) the ions react with the oxygen at the catalyst; forming water.

The product water, plus the water transported across the electrolytic membrane (4) with the ions, can accumulate on the cathode (3). This accumulated water can prevent the oxygen from reaching all possible reaction sites; decreasing efficiency. Additionally, since water is transported across the electrolytic membrane (4) with the ions, the anode (5) can become dried out, again decreasing efficiency or causing cell failure.

To eliminate these problems, a porous element 1 (6) is disposed between two adjacent cells; the cathode chamber (1) of cell (A) and the anode chamber (2') of cell (B). A pressure differential maintained across the porous element 1 (6) causes the water to pass through the porous element 1 (6) from the cathode chamber (1) to the anode chamber (2'); the cathode chamber is maintained at a higher pressure than the anode chamber. The water, once in the anode chamber (2'), wets the anode (5')

of cell (B). Excess water is removed through porous element 2 (7), possibly to a storage tank (9), as shown in FIG. 2.

The pressure differential across the exit porous element 2 (7) is maintained by the back-pressure regulator (8); the pressure at the anode side is greater than the pressure at the exit side of the element. The back-pressure regulator (8) is referenced to the anode chamber (2').

The pore size of the porous element 2 (7) is adjusted to work in combination with the cross pressures in order to provide a self regulating water removal system. As water builds up, the pressure differential across the pores goes to zero, causing the water to be discharged through the pores.

The cell stack temperature is regulated via a heat pipe system (10) which removes waste heat; also a self regulating system. The heat pipe system (10) can be selected to operate all within one temperature range, or at different discrete temperature ranges. As long as sufficient heat sink medium is supplied, the heat pipe system (10) will maintain a constant cell stack temperature. The heat sink medium can be any substance, for instance, air or water, to which the heat is released. The heat pipes can be immersed in the medium (air, water, Freon, etc.), or the medium can flow across the pipes; any possible manner of introducing the heat sink medium to the heat pipes, which removes a sufficient amount of heat to condense the vapor within the pipes, is acceptable.

A pressure gradient across the porous element causes transport water and the water produced at the cathode to be transferred to the anode chamber; wets the anode. The excess water in the anode chamber is removed from the system via a second porous element leading from the cell stack. As with the porous element between the anode and cathode chambers, a pressure differential is maintained across the porous element which removes excess water from the anode chamber. The pressure differential across this porous element is regulated according to the pressure within the anode chamber.

The pressure differential across each porous element can easily be determine by an artisan. Factors taken into consideration when determining the pressure differential include: the size limitations of the porous element, the size and number of the pores, and the amount of water to be transferred or removed. The pressure differential is directly proportional to the amount of water transferred, and indirectly proportional to both the size of the element and the size of the pores (where a constant amount of water is transferred).

The waste heat is removed via a heat pipe system. As the cell releases heat, the fluid within the heat pipes absorbs the waste heat; causing the fluid to evaporate. The vapor travels to the cold end of the pipe where the heat is transferred to a heat sink medium and condensation of the vapors occurs; the cycle repeats. The heat pipes are capable of maintaining a low temperature gradient across the fuel cell. Even in systems with high waste heat production, the temperature gradient can be maintained as low as, and even below approximately 5.0° C.

Different types of heat pipe systems are available for various applications. A heat pipe system with single conductance capability can be used for operations over a relatively small current density range, i.e. $d_1$ to $d_2$ (see FIG. 3), and at relatively constant temperature, $T_1$. Where the operating temperature varies, and/or the current density range is relatively large, i.e. $T_1$ to $T_3$ and $d_1$ to $d_4$ respectively, either the heat sink temperature can be varied, or a multiple heat pipes system or a variable conductance heat pipe system can be utilized.

Figure 3:
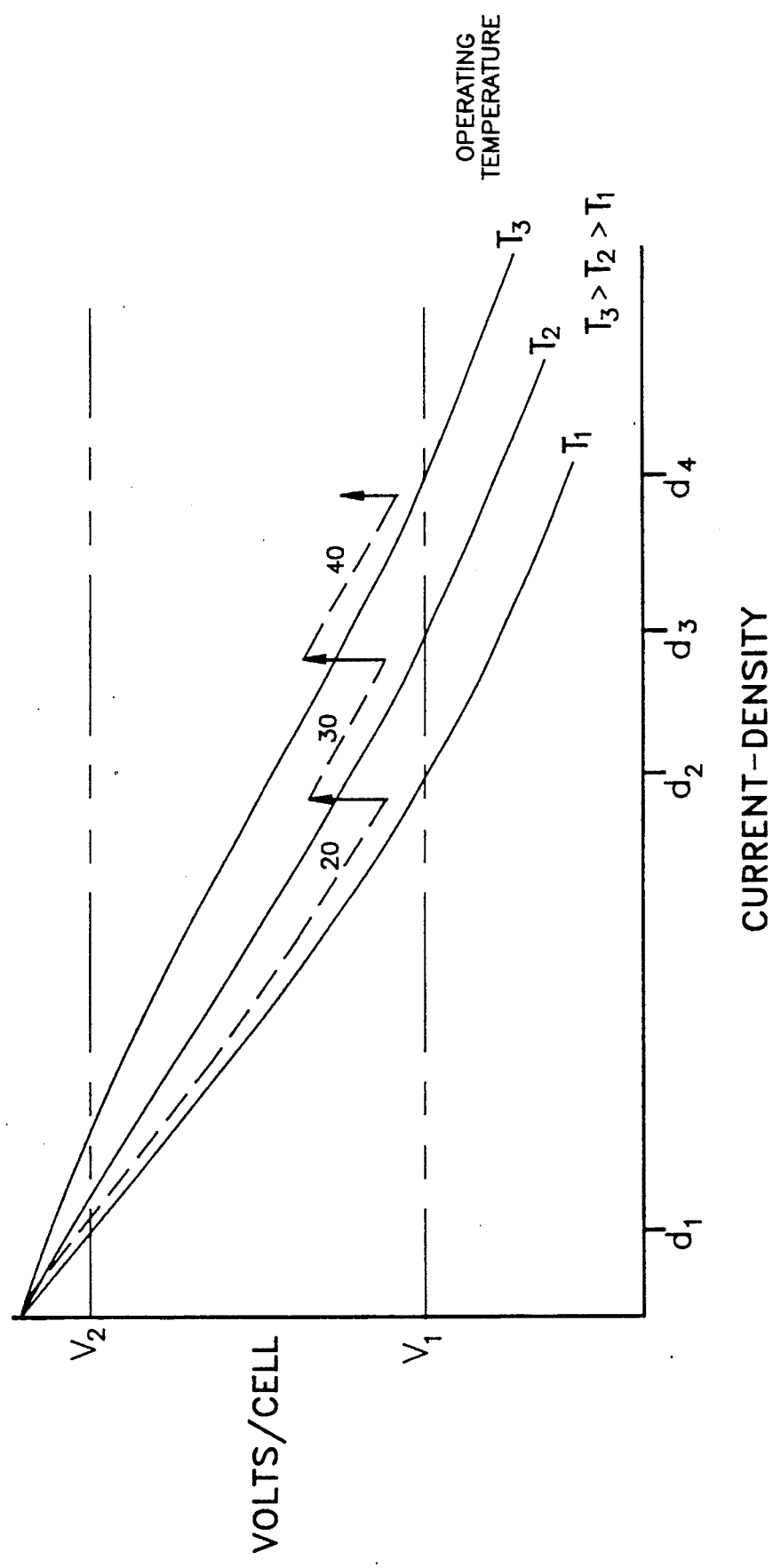
FIG. 3 illustrates the effect on current density and temperature of utilizing a heat pipe system with the heat pipes in the system containing different types of fluids.

FIG. 3 represents the different discrete operating ranges for the above mentioned systems. A single conductance system, for example, can be capable of operating within any one of these temperature ranges (line 20, 30, or 40). A multiple heat pipes system or variable conductance system could be capable of operating over the temperature range (from line 20 through line 40).

The operation of a heat pipe is commonly understood in the art, a fluid within the heat pipe absorbs heat from an object, evaporates, flows to the cool end of the pipe where the heat is given off, the vapor condenses, and the cycle repeats. Even where the operation is over a temperature range and/or a relatively large current density range, the operation of the heat pipes is the same. The difference arises in the type of fluid within the heat pipe which allows operation at different discrete temperature ranges. Other factors which can affect the conductivity of a heat pipe, beside varying the fluid, include: the material of the heat pipe and the thickness of the pipe wall.

In the multiple heat pipes system, for example, Heat Pipe No. 1, containing fluid 1, is capable of maintaining the system at 180° F., for example. As the stack temperature begins to rise, the conducting capacity of Heat Pipe No. 1 is exceeded and Heat Pipe No. 2, containing fluid 2, becomes operative. This process can be continued for as many different heat pipes within the system which operate at different discrete temperature ranges.

A variable conductance heat pipe system operates in relatively the same manner, with one heat pipe capable of operating over a range of temperature. This effect can be accomplished in numerous manners. One technique of accomplished this effect is through the utilization of gas buffering (varying back-pressure on the heat pipe), as is commonly know:. by one skilled in the art. Varying the temperature of the heat sink medium can also expand the operating temperature range of a heat pipe system.

For instance, a possible temperature range, utilizing either a multiple heat pipes system or variable conductance heat pipe system, such as that shown in FIG. 3, may be from 180 to 240° F.; $T_1$ at 180° F., $T_2$ at 210° F., and $T_3$ at 240° F. The heat pipes capable of such a range can be obtained from Thermacore, Inc., Lancaster, PA, Noren Products, Inc., Menlo Park, Calif., or Furakawa Electric America, Inc., New York, N.Y. For variable conductance heat pipe systems, the companies listed above can supply the necessary hardware.

In the constant temperature/low current density temperature range operation, single conductance heat pipes are preferred for reasons of cost. However, where the fuel cell will be operated over a variable temperature and/or high current density range, either the multiple heat pipes system or the variable conductance heat pipe system is preferred. Factors to consider between the two latter systems are cost and space limitations, the multiple heat pipes system requires a greater number of pipes (one for each temperature) than the variable conductance heat pipe system. Both of the latter systems, as can be seen in FIG. 3, allow for operation at higher current densities than a single conductance heat pipe system (line 20), while maintaining a discrete voltage range; commonly required in many fuel cell systems.

The combination of the porous element and the heat pipes allows the system to be operated at a higher current density. Such operation reduces capital costs at a constant operating efficiency. Since the system's accessories merely consist of a coupled fuel and oxidant regulator, back pressure regulator, and heat pipes, the accessory section is simplified compared to that conventionally utilized in the art; decreasing maintenance and maintenance costs. The system also operates with greater efficiency and higher reliability than the prior art. The use of the porous elements, eliminating the need for a circulating pump and condenser, and the heat pipes, eliminating the need for a coolant pump, a coolant heat exchanger, and thermal and other controls, allows for a reduction in overall system size. This system allows for high temperature/current density operation with increased efficiency.

Although this invention has been shown and described with respect to detailed embodiments thereof, it will be understood by those skilled in the art that various changes in form and detail thereof may be made without departing from the spirit and scope of the claimed invention.

I claim:

1. A method of improving the current density of a solid polymer fuel cell systems, said system having at least two solid polymer fuel cells connected electrically through a load, each cell comprising a cathode, an anode, an electrolyte disposed therebetween, a cathode chamber, and an anode chamber means for delivering and regulating fuel to the anode chamber, and means for delivering and regulating oxidant to the cathode chamber, at least one hydrophilic porous element for transferring water from the cathode chamber to the anode chamber, and at least one hydrophilic porous element for removing water from the anode chamber, wherein said improvement comprises: removing heat from the system with at least one heat pipe, wherein said heat pipe maintains as low a temperature gradient across said cell as is practical; whereby the combination of said heat pipe and said porous element prevents excess heat from building up and the anode from drying out, respectively, and wherein said initial porous element prevents accumulation of water at the cathode and wets the anode.

2. A method as in claim 1 wherein said means for delivering and regulating the fuel and oxidant is a coupled regulator.

* * * * *

UNITED STATES PATENT AND TRADEMARK OFFICE
CERTIFICATE OF CORRECTION

PATENT NO. : 5,064,732

DATED : November 12, 1991

INVENTOR(S) : Alfred P. Meyer

It is certified that error appears in the above-identified patent and that said Letters Patent is hereby corrected as shown below:

In Column 3, line 10, following "element", please insert --1 (6) and the exit porous element--.

Signed and Sealed this

Twenty-third Day of February, 1993

*Attest:*

STEPHEN G. KUNIN

*Attesting Officer*      *Acting Commissioner of Patents and Trademarks*